United States Patent [19]

Martin et al.

[11] Patent Number: 4,957,321
[45] Date of Patent: Sep. 18, 1990

[54] STOWABLE VEHICLE SEAT WITH SEAT BACK POSITION CONTROLLER

[75] Inventors: Norman G. Martin, Royal Oak; William J. Eubank, Livonia, both of Mich.

[73] Assignee: Ford Motor Company, Dearborn, Mich.

[21] Appl. No.: 256,447

[22] Filed: Oct. 12, 1988

[51] Int. Cl.$^5$ .............................................. B60N 1/02
[52] U.S. Cl. ................................... 296/65.1; 297/379
[58] Field of Search ............... 296/65.1; 297/379, 346, 297/344, 345, 378

[56] References Cited

U.S. PATENT DOCUMENTS

| | | | |
|---|---|---|---|
| 2,620,020 | 12/1952 | Austin | 297/378 |
| 2,926,948 | 3/1960 | Koplin et al. | 297/378 |
| 3,316,014 | 4/1967 | Barecki | 297/346 |
| 4,046,349 | 9/1977 | MacAfee | 297/344 X |
| 4,461,511 | 7/1984 | Berneking et al. | 297/355 X |
| 4,484,776 | 11/1984 | Gokimoto et al. | 296/65.1 X |
| 4,700,989 | 10/1987 | Ercilla | 296/65.1 X |
| 4,805,953 | 2/1989 | Yamauchi | 296/65.1 X |
| 4,807,932 | 2/1989 | Hong | 297/344 X |

FOREIGN PATENT DOCUMENTS

| | | | |
|---|---|---|---|
| 1135786 | 8/1962 | Fed. Rep. of Germany | 297/345 |
| 2251949 | 5/1974 | Fed. Rep. of Germany | 297/355 |
| 0085730 | 5/1983 | Japan | 296/65.1 |

Primary Examiner—Robert R. Song
Attorney, Agent, or Firm—Daniel M. Stock; Clifford L. Sadler

[57] ABSTRACT

A stowable vehicle seat provides for movement of the seat cushion of the seat from an elevated seating position to a stowed position adjacent the floor of the vehicle only upon movement of the seat back from a vertical seating position to a generally horizontal folded position. A parallel link arrangement is provided between the vehicle and the seat cushion and a control linkage provides for shifting the parallel link arrangement from a locked to a free position in response to movement of the seat back.

11 Claims, 3 Drawing Sheets

STOWABLE VEHICLE SEAT WITH SEAT BACK POSITION CONTROLLER

BACKGROUND OF THE INVENTION

The present invention relates generally to vehicle seats, and more particularly to vehicle seats of the type utilized in the rear seating positions of utility vehicles having provisions for folding down the seats to form a load floor in the vehicle.

It is known to provide a vehicle seat whose seat cushion height and longitudinal position is controlled by the motion of an arrangement of parallel links pivotally mounted between the seat cushion and the vehicle floor. A copending application of one of the applicants and Martienssen discloses a particularly advantageous version of such a seat positioning linkage system. This copending application also shows a latching mechanism for stopping the pivotal movement of the positioning linkage in a variety of positions.

Another copending application of one of the applicants of the present invention discloses other variant mechanisms utilized in the latching of such a seat for intermediate positioning. Each of the latching mechanisms, however, are operative completely independently of the position of the seat back of the stowable vehicle seat which is arranged to be pivoted from an upright vertical position to an essentially horizontal position in a stowable vehicle seat to define a load floor. It is desirable in certain vehicle applications to ensure that the seat cushion is moved to the stowed position only when the seat back is folded downwardly and not when in the full upright position.

It is known in the vehicle seating arts to provide mechanisms to prevent the inadvertent adjustment of seat positions. *Berneking et al*, U.S. Pat. No. 4,461,511, is exemplary of such devices. Like the latches of the above mentioned copending applications, however, such devices have not coordinated the position of the seat back with the prevention of inadvertent adjustment.

Another seat locking arrangement for positioning pivoting links is exemplified in *Ercilla*, U.S. Pat. No. 4,700,989. It likewise operates independently of the position of the seat back.

Controls for the positioning of seat backs in stowable seats is also known. See, for example, *Gokimoto et al*, U.S. Pat. No. 4,484,776, which provides for a control linkage, again, an independent one, for moving the seat back from its upright to a stowed position.

SUMMARY OF THE INVENTION

Responsive to the deficiencies in the prior art, it is an object of the present invention to provide a stowable seat assembly having a controller operatively disposed to prevent movements of the seat cushion from its normal seating position to its stowed position when the seat back is in the upright position.

It is a further object of the present invention to provide a stowable seat assembly having such a controller that is operatively disposed between a pivotally mounted seat back and a parallel linkage arrangement for stowing the seat cushion in a simple, effective and economical manner.

According to a feature of the present invention, a stowable seat assembly of the type employing a seat cushion with a seat back pivotally mounted to the seat cushion and a set of parallel links for moving the seat cushion from an elevated position to a position adjacent the vehicle floor is provided with a slot for mounting the parallel linkage with respect to the seat cushion and a control link operative to move the linkage within the slot from the position defining a set of parallel links permitting the stowing movement and a position defining a set of non-parallel links for preventing the movement in response to movement of the seat back between upright and folded positions.

BRIEF DESCRIPTION OF THE DRAWINGS

These and other objects and features of the invention will become apparent to those skilled in the vehicle seating arts upon reading the following description with reference to the accompanying drawings, in which.

DESCRIPTION OF THE PREFERRED EMBODIMENT

Figure 1:
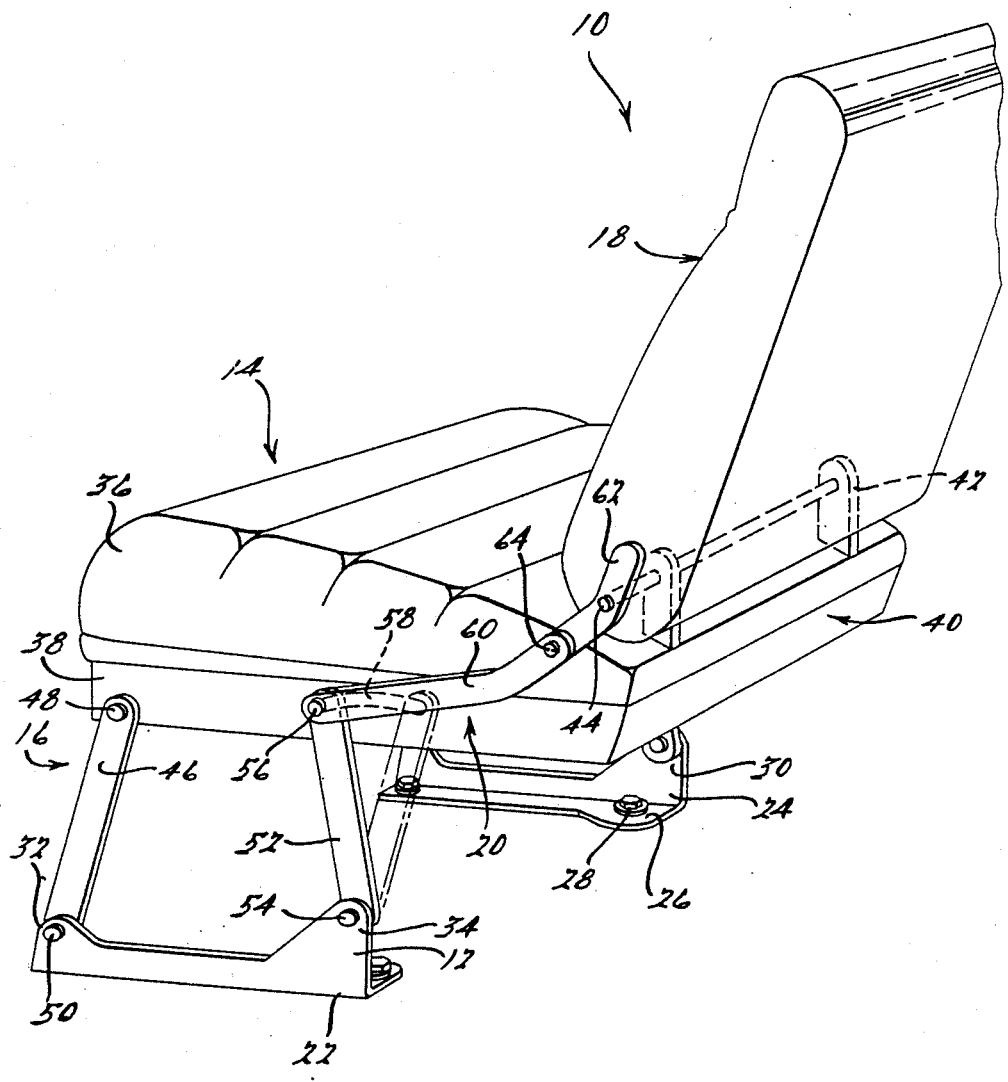
FIG. 1 is a simplified perspective view of a stowable seat assembly according to the present invention.

A stowable seat assembly 10 for a vehicle is illustrated as including a support frame 12 configured to be fixedly secured to a vehicle floor (not shown), a seat cushion assembly 14, a positioning link assembly 16 operatively disposed between support frame 12 of the seat cushion 14, a seat back 18 pivotally mounted on the seat cushion 14 and a seat back position sensitive control link assembly 20 operatively connected between the seat back 18 and the positioning link assembly 16.

The support frame 12 is illustrated as comprising a pair of laterally outwardly positioned support plates 22, 24, each of which includes a base portion 26 arranged to be fixedly secured to the vehicle as through well-known fasteners, such as the bolts indicated at 28. The support plates 22, 24 further include outboard, upstanding side portions 30 having front and rear trunnion mounts 32, 34, respectively.

The seat cushion 14 necessarily includes an upper padded cushion portion 36 and a lower rigid frame portion 38. Proximate the rear edge 40 of the seat cushion 14, a pair of upstanding pivot plates 42 are secured to the frame 38 in a known manner. A rod member 44 may extend between the pivot plates 42 for defining the pivotal axis of the seat back 18 with respect to the seat cushion 14.

The positioning link assembly 16 consists essentially of a front link 46 positioned on each side of the stowable seat assembly 10 mounted at its upper end to the seat cushion frame 38 as by a pivot pin 48 and at its lower end to the support frame trunnion mount 32 as by a pivot pin 50. Longitudinally displaced rearwardly from the front link 46 on each side is a rear link 52 mounted at its lower end to the support frame trunnion mount 34 as by a pivot pin 54 and at its upper end to the seat cushion frame 38 as by pivot pin 56. The mounting of the pivot pin 56 of rear link 52 to the frame 38 of the seat cushion 14 is effected through a slot 58 extending an arcuate path along the radius defined by the path of the link 52 pivoting about the pivot pin 54 in the support frame trunnion mount 34. The link 52 pivots between the position shown in solid line in FIG. 1 in which rear link 52 and front link 46 are not parallel and stowing movement of the seat cushion 14 is prevented and the dotted line position where the front link 46 and the rear link 52 are parallel and parallelogram motion permits movement of the seat cushion 14 from the elevated position shown to a stowed position proximate the vehicle floor.

The seat back position sensitive controller 20 is illustrated as comprising a control link 60 and a pivot plate 62. The control link 60 is pivotally mounted on the pivot pin 56 at the upper end of rear link 52 of the positioning link assembly 16. The rear end of the control link 60 is pivotally mounted, as indicated by the pivot pin 64, on the pivot plate 62. The pivot plate 62 is illustrated as being carried externally of the seat back 18 and is arranged to be pivotally mounted on the rod 44 constrained to move pivotally with the seat back 18 by suitable abutments carried within the seat back 18.

OPERATION OF THE PREFERRED EMBODIMENT

Figure 2:
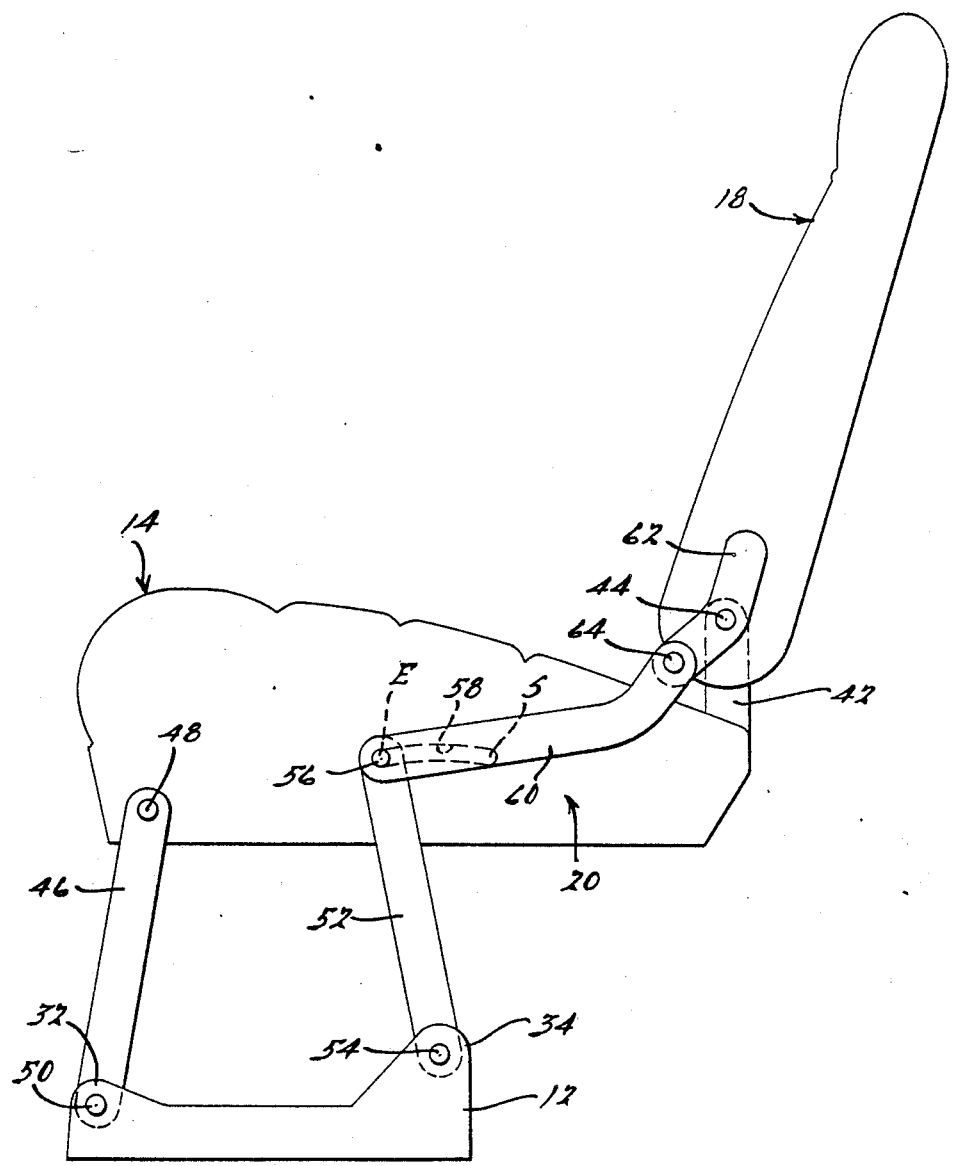
FIG. 2 is a side view of the seat of FIG. 1 in the upright position.
Figure 3:
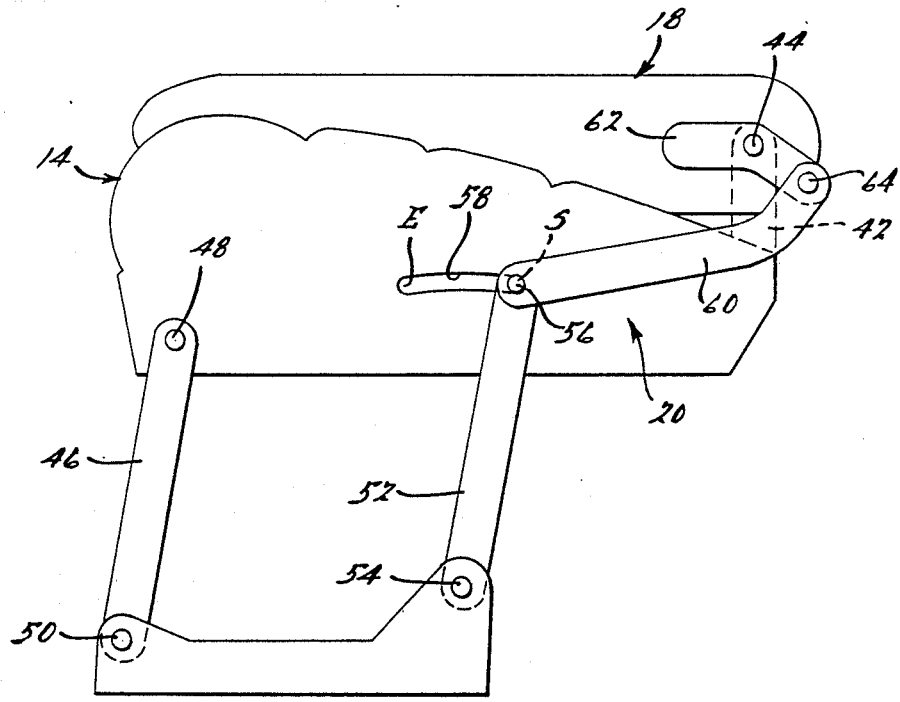
FIG. 3 is a view similar to FIG. 2 showing the seat back in the folded position.
Figure 4:
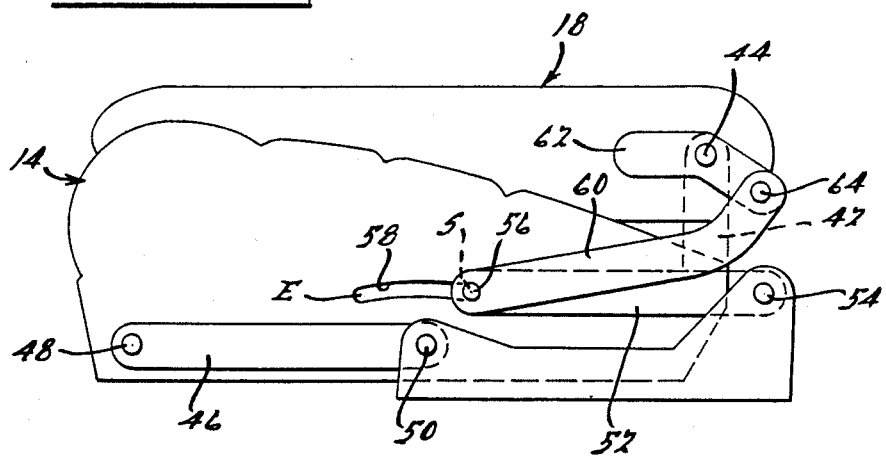
FIG. 4 is a view showing the stowable seat assembly of the present invention in the fully stowed position.

Turning now to FIGS. 2-4, the motion of the seat cushion 14 and the seat back 18 with respect to the support frame 16 and, hence, the vehicle floor, is illustrated. The pivotal axes relevant to this description are called out in these drawing figures by the numerals associated with the pivot pins defined in the description of the FIG. 1 embodiment. Front and rear links 46, 52 respectively, therefore, are illustrated in FIG. 2 in nonparallel solid line position as shown in FIG. 1 the upper pivot 56 of the rear link 52 is positioned forwardly to the end "E" of the slot 58 corresponding to the elevated position of the seat cushion 14 with respect to the support frame 16. The seat back 18 is positioned in the substantially vertical position for the seating of a vehicle occupant.

FIG. 3 illustrates the operation of the seat back sensitive control linkage assembly 20 as the seat back 18 is folded from its upright position of FIGS. 1 and 2 and its stowing position, which is substantially horizontal in confronting relationship with the upper surfaces of the seat cushion 14. When moved to this position, the pivot plate 62 pivots about the axis of the rod 44 and draws the control link 60 rearwardly, moving the pivot pin 56 from the forward end "E" of the slot 58 to the rearward end "S" for stowing the seat back in preparation to stow the entire seat assembly 10. It will be noted that when the rear link 52 is positioned as shown in FIG. 3, it is parallel to the front link 46 and parallelogram motion can then proceed from the position shown in FIG. 3 to that shown in FIG. 4 in which the seat cushion 14 is moved fully downwardly with respect to the support frame 16. Return of the seat cushion 14 and the seat back 18 to their upright positions repositions the rear link 52 into the locking position shown in FIGS. 1 and 2.

It will be understood that latching mechanisms to set intermediate positions between the elevated position and the stowed position of the seat cushion 14 may also be employed with the stowable seat assembly 10 of the present invention, including those discussed in the a Background of the Invention section of this application, but their operation will be ineffective except when the seat back 18 is in the folded-down position.

While only one embodiment of the stowable seat assembly of the present invention has been disclosed, others may be possible without departing from the scope of the appended claims.

We claim:

1. In a stowable seat assembly for a vehicle of the type having a horizontally positioned seat cushion, a seat back mounted on the seat cushion for pivotal movement about an axis between a substantially vertical position and a substantially horizontal stowing position and positioning linkage means having upper pivot means for pivotally mounting the positioning linkage means to the seat cushion and lower pivot means pivotally mounted with respect to the vehicle floor to permit movement of the seat cushion between a seating position elevated from the vehicle floor and a stowed position adjacent to the vehicle floor, a controller operative in response to pivotal movement of the seat back to prevent movement of the seat cushion from the seating position to the stowed position when the seat back is in the vertical position.

2. A stowable seat assembly for a vehicle comprising:
   a generally horizontal seat cushion;
   a seat back mounted on the seat cushion for pivotal movement about an axis between a substantially vertical position and a substantially horizontal stowing position;
   first and second longitudinally spaced elongated positioning link means each pivotally mounted with respect to the seat cushion and with respect to the vehicle floor; and
   slot means formed in the seat cushion and adapted to pivotally mount one of the positioning link means to permit pivotal movement of said one positioning link means along a pivotal path between a folding position parallel to the other positioning link means permitting parallelogram movement of the seat cushion between a seating position elevated from the vehicle floor and a stowed position adjacent the vehicle floor, and a locked position canted with respect to the other link preventing said parallelogram movement.

3. A stowable seat assembly as defined in claim 2 and further comprising a controller operative to prevent movement of the one positioning link means from the locked position to the seating position when the seat back is in the vertical position.

4. A stowable seat assembly for a vehicle comprising:
   a generally horizontal seat cushion;
   a seat back mounted on the seat cushion for pivotal movement about an axis between a substantially vertical position and a substantially horizontal stowing position;
   first and second longitudinally spaced elongated positioning link means each pivotally mounted with respect to the seat cushion and with respect to the vehicle floor;
   slot means formed in the seat cushion and adapted to pivotally mount one of the positioning link means to permit pivotal movement of said one positioning link means along a pivotal path between a folding position parallel to the other positioning link means permitting parallelogram movement of the seat cushion between a seating position elevated from the vehicle floor and a stowed position adjacent the vehicle floor, and a locked position canted with respect to the other link preventing said parallelogram movement; and
   a controller operative to move the one positioning link means between the folding and locked positions in response to movement of the seat back from the stowed to the vertical position.

5. A stowable seat assembly as defined in claim 4 wherein the controller comprises elongated control link means pivotally mounted at one end to the seat back and at the other end to the positioning linkage means and operative to pivot the positioning linkage means between the locked position and the folding position, in response to movement of the seat back from the vertical position toward the stowing position.

6. A stowable seat assembly as defined in claim 5, and further comprising means defining a seat back pivot plate mounted for pivotal movement with the seat back about the seat back pivotal axis and pivotally connected to the control link means.

7. A stowable seat assembly as defined in claim 2 wherein the seat cushion slot means is arcuately formed parallel to the pivotal path of the one link means.

8. A stowable seat assembly as defined in claim 4 wherein the seat cushion slot means is arcuately formed parallel to the pivotal path of the one link means.

9. In a stowable seat assembly for a vehicle of the type having a horizontally positioned seat cushion, a seat back mounted on the seat cushion for pivotal movement about an axis between a substantially vertical position and a substantially horizontal stowing position and positioning linkage means having upper pivot means for pivotally mounting the positioning linkage means to the seat cushion and lower pivot means pivotally mounted with respect to the vehicle floor to permit movement of the seat cushion between a seating position elevated from the vehicle floor and a stowed position adjacent to the vehicle floor, a controller operative to prevent movement of the seat cushion from the seating position to the stowed position when the seat back is in the vertical position comprising elongated control link means pivotally mounted at one end to the seat back and at the other end to the positioning linkage means and operative to pivot the positioning linkage means between a first position preventing movement of the seat cushion from the seating position to the stowed position and a second position permitting said movement, in response to movement of the seat back from the vertical position toward the stowing position.

10. A controller as defined in claim 9, and further comprising slot means operatively disposed between the positioning linkage means upper pivot means and the seat cushion to permit movement of the positioning linkage means between said first and second positions.

11. A controller as defined in claim 9, and further comprising means defining a seat back pivot plate mounted for pivotal movement with the seat back about the seat back pivotal axis and pivotally connected to the control link means.

* * * * *